(12) United States Patent
Huang et al.

(10) Patent No.: US 7,794,639 B2
(45) Date of Patent: Sep. 14, 2010

(54) METHOD FOR MANUFACTURING CARBON NANOTUBE COMPOSITE

(75) Inventors: Hua Huang, Beijing (CN);
Chang-Hong Liu, Beijing (CN);
Shou-Shan Fan, Beijing (CN)

(73) Assignees: Tsinghua University, Beijing (CN);
Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 1268 days.

(21) Appl. No.: 11/143,424

(22) Filed: Jun. 2, 2005

(65) Prior Publication Data

US 2006/0135677 A1    Jun. 22, 2006

(30) Foreign Application Priority Data

Jun. 7, 2004    (CN)    .......................... 2004 1 0027632

(51) Int. Cl.
*B29C 47/02*    (2006.01)
(52) U.S. Cl. .................. 264/211; 264/210.6; 264/210.7; 524/496; 524/847
(58) Field of Classification Search ........................ None
See application file for complete search history.

(56) References Cited

U.S. PATENT DOCUMENTS 3,726,624 A * 4/1973 Schwarz ...................... 425/145
6,426,134 B1 * 7/2002 Lavin et al. .............. 428/300.1
7,001,556 B1 * 2/2006 Shambaugh ............. 264/210.6

FOREIGN PATENT DOCUMENTS

CN    02113457.X    4/2003

* cited by examiner

Primary Examiner—Monica A Huson
(74) Attorney, Agent, or Firm—D. Austin Bonderer

(57) ABSTRACT

A method for manufacturing a carbon nanotube composite, comprising the steps of: (a) preparing a solution of a polymer precursor; (b) immersing carbon nanotubes in the solution and ultrasonically cleaning the solution; (c) polymerizing the polymer precursor in order to obtain a polymer matrix having carbon nanotubes uniformly dispersed therein; (d) forming the polymer matrix into a composite having carbon nanotubes distributed therein by way of extrusion; and (e) elongating the composite so as to cause the carbon nanotubes to be orderly distributed therein.

19 Claims, 2 Drawing Sheets

METHOD FOR MANUFACTURING CARBON NANOTUBE COMPOSITE

BACKGROUND OF THE INVENTION

The invention relates generally to methods for manufacturing composites, and more particularly to a method for manufacturing a carbon nanotube composite.

Carbon nanotubes were discovered by Dr. Iijima at NEC Corporation, Japan in 1991. A carbon nanotube is a type of fullerene that exhibits more excellent thermal and mechanical properties than steel and other alloys, yet has low density characteristics similar to or below that of currently available ceramic or polymer composites. Typically, a carbon nanotube can have a heat conduction coefficient of 6600 W/mK (watts/milliKelvin) at room temperature, a tensile strength of up to 100 Gpa (gigapascal), and a Young's modulus of up to 1 Tpa (thousandpascal). Moreover, carbon nanotubes have outstanding chemical stability such as acid-alkali resistance, and resistance to oxidization below 600° C. The remarkable properties exhibited by carbon nanotubes has led scientists and engineers to devote much effort to developing mass production techniques. Over time, carbon nanotubes have become increasingly available, and more attention from both academia and industry is being focused on the applications of carbon nanotubes in bulk quantities. These applications include using carbon nanotubes as a filler material in a polymer matrix that serves as a reinforcement in structural materials.

However, carbon nanotube polymer composite is often difficult to produce when incorporated into a polymer matrix. Frequently, during the formation of such composite, gravity pulls and separates denser composite material from the lightweight carbon nanotube composite material. Moreover, due to their crystalline and electrical characteristics, carbon nanotubes tend to conglomerate into each other during the composite formation process rather than uniformly dispersing in the matrix composite material.

In order to solve the above-described problem, a method for manufacturing a carbon nanotube composite is provided. During the formation process of the composite, conglomerated carbon nanotubes are distributed by way of an ultrasonic cleaning process. Moreover, due to the dispersing effect achieved by the ultrasonic cleaning process, the carbon nanotubes are uniformly dispersed in a matrix composite material.

However, a composite obtained by the method contains carbon nanotubes that are disorderly distributed in a polymer matrix. The disorderly distribution of the carbon nanotubes adversely impairs physical and chemical properties of the carbon nanotubes. In addition, the performance of the carbon nanotube composite achieved by the method may be less satisfactory.

What is needed, therefore, is a method for manufacturing a composite having carbon nanotubes orderly arranged and uniformly dispersed therein.

SUMMARY

In a preferred embodiment, a method for manufacturing a carbon nanotube composite, comprising the steps of: (a) preparing a solution of a polymer precursor; (b) immersing carbon nanotubes in the solution and ultrasonically cleaning the solution; (c) polymerizing the polymer precursor in order to obtain a polymer matrix having carbon nanotubes uniformly dispersed therein; (d) forming the polymer matrix into a composite having carbon nanotubes distributed therein by way of extrusion; and (e) elongating the composite so as to cause the carbon nanotubes to be orderly distributed therein.

Compared with conventional methods for manufacturing a carbon nanotube composite, the method of the preferred embodiment can be used to produce a composite having carbon nanotubes distributed orderly and uniformly therein. The carbon nanotubes composite achieved by the preferred method can exhibit more excellent thermal and mechanical properties than those of carbon nanotube composites obtained by conventional methods.

Other advantages and novel features will become more apparent from the following detailed description of preferred embodiments when taken in conjunction with the accompanying drawings, in which:

DETAILED DESCRIPTION OF PREFERRED EMBODIMENTS

Figure 1:
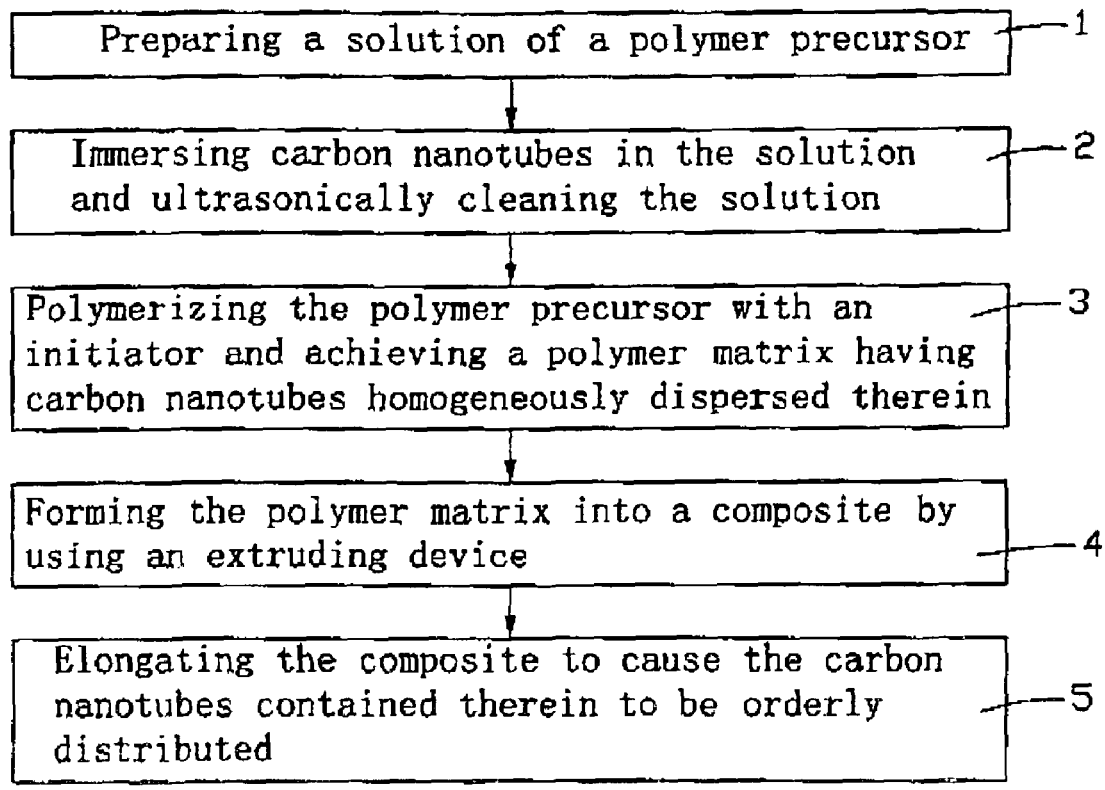
FIG. 1 is a flow chart of a method for manufacturing a carbon nanotube composite in accordance with a preferred embodiment of the present invention.

Referring to FIG. 1, a method for manufacturing a carbon nanotube composite in accordance with a preferred embodiment of the present invention includes the steps of:
(a) preparing a solution of a polymer precursor;
(b) immersing carbon nanotubes in the solution and ultrasonically cleaning the solution;
(c) polymerizing the polymer precursor with an initiator and obtaining a polymer matrix having carbon nanotubes uniformly dispersed therein;
(d) forming the polymer matrix into a composite by using an extruding device; and
(e) elongating the composite so as to cause the carbon nanotubes to be orderly distributed therein.

The steps of the preferred method will be described in detail below. Referring to FIG. 1, step (a) is to prepare a solution of a polymer precursor. The polymer precursor generally comprises a prepolymer or a prepolymer monomer. The prepolymer can be polyurethane or an epoxide resin. In the preferred embodiment, the prepolymer is polyurethane. Industry adhesives are in general comprised of polyurethane. In the illustrated embodiment, a double component adhesive, "adhesive timeao 101," is used as the prepolymer. The adhesive timeao 101 comprises component A and component B. The method for manufacturing the solution of polyurethane includes the steps of: dissolving and diluting the component A of the polyurethane with ethyl acetate to obtain a solution of prepolymer; and ultrasonically cleaning the treated solution for a few minutes to achieve a uniformly dispersed solution of polyurethane.

Step (b) is to immerse carbon nanotubes in the solution and ultrasonically clean the solution. In the preferred embodiment, the carbon nanotubes can be formed by chemical vapor deposition, arch discharge, or laser ablation. The carbon nanotubes may include multi-walled nanotubes, single-walled nanotubes or a mixture thereof. Diameters of the carbon nanotubes are in the range from 1 to 10 micrometers.

In order to avoid the carbon nanotubes conglomerating with each other in the solution, step (b) preferably further includes the steps of: ultrasonically cleaning the solution for a few minutes; disturbing the solution by using an ultrasonic disturber to disperse the conglomerated carbon nanotubes; and ultrasonically cleaning the treated solution for a few minutes to uniformly disperse the carbon nanotubes therein. By means of the disturbing by the ultrasonic disturber and the ultrasonic cleaning, the carbon nanotubes can be effectively dispersed uniformly.

Step (c) is to polymerize the polymer precursor with an initiator and to obtain a polymer matrix having carbon nanotubes uniformly dispersed therein. In the illustrated embodiment, the initiator includes a solution of ethanol or deionized water having component B of the polyurethane dispersed therein. The initiator is added in the solution of the prepolymer having component A of the polyurethane, in order to polymerize the polymer. A proportion by weight between the initiator and the prepolymer is preferably about 5:1. Then, after ultrasonically cleaning the mixture solution, sediment is collected. The sediment is a polymer matrix having carbon nanotubes therein. In the illustrated embodiment, the obtained polymer is a black grease material. The carbon nanotubes are disorderly and uniformly dispersed therein.

Figure 2:
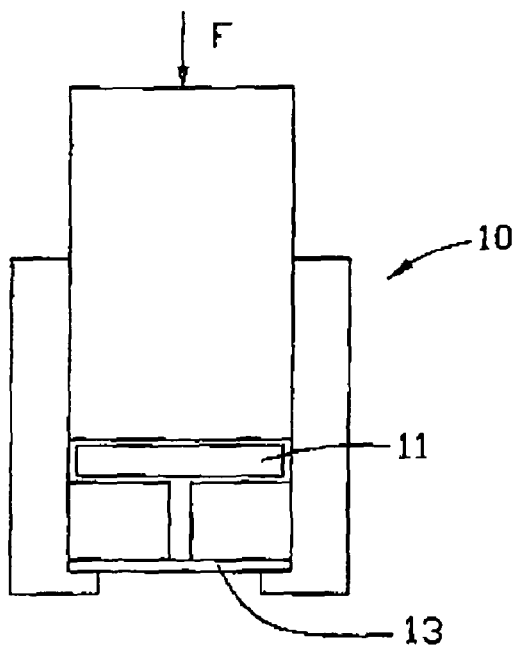
FIG. 2 is a schematic diagram of an extruding device used in the preferred embodiment of the present invention.

Step (d) is to form the achieved polymer matrix 11 into a composite by using an extruding device 10. Referring to FIG. 2, an external force F is applied to extrude the polymer 11 through a screen net 13. In the preferred embodiment, an aperture of the screen net of the extruding device 10 is in the range from 30 to 500 micrometers. After extrusion, the carbon nanotubes are orderly arranged in the polymer along a same direction.

Figure 3:
FIG. 3 is a scanning electron microscope photo of a composite obtained by the method of FIG. 1.

Step (c) is to elongate the extruded polymer to cause the carbon nanotubes to be orderly distributed in the composite. Referring to FIG. 3, the composite obtained is fiber-shaped, with a diameter in the range from 30 to 50 micrometers. The carbon nanotubes in the composite are reoriented orderly along a same direction that is perpendicular to a radial direction of the fiber-shaped composite.

Compared with conventional methods for manufacturing a carbon nanotube composite, the method of the preferred embodiment can be used to produce a composite having carbon nanotubes distributed orderly and uniformly therein. The carbon nanotubes composite achieved by the preferred method can exhibit more excellent thermal and mechanical properties than those of carbon nanotube composites obtained by conventional methods.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for manufacturing a carbon nanotube composite, comprising the steps of:
   (a) preparing a solution of a polymer precursor;
   (b) immersing carbon nanotubes in the solution and ultrasonically cleaning the solution of the polymer precursor;
   (c) polymerizing only the polymer precursor to obtain a polymer matrix, and the carbon nanotubes being uniformly dispersed therein;
   (d) forming the polymer matrix and the carbon nanotubes dispersed therein into a composite by way of extrusion; and
   (e) elongating the composite so as to cause the carbon nanotubes to be orderly distributed therein.

2. The method as claimed in claim 1, wherein step (b) further comprises the steps of:

(b1) immersing carbon nanotubes in the solution and ultrasonically cleaning the solution;

(b2) processing the solution by means of an ultrasonic disturber in order to disperse any conglomerated carbon nanotubes created in step (b1); and (b3) ultrasonically cleaning the treated solution so as to cause the carbon nanotubes to be uniformly dispersed therein.

3. The method as claimed in claim 1, wherein the polymer precursor is a prepolymer or a prepolymer monomer.

4. The method as claimed in claim 3, wherein the prepolymer comprises polyurethane or epoxide resin.

5. The method as claimed in claim 4, further comprising the steps of:
   (f) dissolving and diluting a polyurethane with ethyl acetate to obtain the solution of prepolymer; and
   (g) ultrasonically cleaning the treated solution.

6. The method as claimed in claim 1, wherein in step (c), the polymerization is initiated with an initiator that comprises ethanol or deionized water.

7. The method as claimed in claim 1, wherein the extruding step is performed with an extruding device that comprises a screen net.

8. The method as claimed in claim 7, wherein an aperture of the screen net is in the range from 30 to 500 micrometers.

9. The method as claimed in claim 1, wherein a diameter of the composite is in the range from 30 to 50 micrometers.

10. The method as claimed in claim 9, wherein the composite is fiber-shaped.

11. The method as claimed in claim 10, wherein the carbon nanotubes are orderly distributed in the composite and substantially perpendicular to a radial direction of the composite.

12. The method as claimed in claim 1, wherein the carbon nanotubes comprise multi-walled nanotubes, single-walled nanotubes, or a mixture thereof.

13. The method as claimed in claim 12, wherein diameters of the carbon nanotubes are in the range from 1 to 10 micrometers.

14. The method as claimed in claim 1, wherein step (d) further comprises the steps of:
   providing an extruding device having a screen net;
   putting the polymer matrix with the carbon nanotubes dispersed therein in the extruding device; and
   applying an external force to extrude the polymer matrix with carbon nanotubes through the screen net.

15. The method as claimed in claim 14, wherein an aperture of the screen net of the extruding device is in a range from 30 micrometers to 500 micrometers.

16. The method as claimed in claim 6, wherein a proportion by weight between the initiator and the polymer precursor is about 5:1.

17. A method for manufacturing a carbon nanotube composite, comprising the steps of:
   acquiring a precursor capable of reacting to form said composite;
   dispersing a plurality of carbon nanotubes within said precursor;
   polymerizing only the precursor to acquire a polymer matrix, and the plurality of carbon nanotubes being dispersed in the polymer matrix, wherein the polymerization is initiated with an initiator that comprises ethanol or deionized water; and extruding the polymer matrix having the carbon nanotubes dispersed therein to orient said plurality of carbon nanotubes in said composite.

18. The method as claimed in claim 17, wherein the polymerization is initiated with an initiator that comprises ethanol or deionized water.

19. The method as claimed in claim 18, wherein a proportion by weight between the initiator and the polymer precursor is about 5:1.

* * * * *